United States Patent
Wilhelm et al.

[11] 3,891,782
[45] June 24, 1975

[54] METHOD OF EXTRACTING POTATO FLOUR FROM WASTE PEEL AND DEHYDRATOR WASTE

[75] Inventors: Max G. Wilhelm; William Truman Manning; James D. O'Neil, all of Minneapolis, Minn.

[73] Assignee: The Pillsbury Company, Minneapolis, Minn.

[22] Filed: Oct. 12, 1973

[21] Appl. No.: 405,946

[52] U.S. Cl. ............ 426/455; 426/469; 426/472; 426/473; 426/483; 426/506; 99/567; 99/584
[51] Int. Cl. ............................................. A23b 7/03
[58] Field of Search ........... 426/455, 456, 457, 465, 426/469, 472, 473, 478, 479, 481, 482, 483, 506; 99/584, 567

[56] References Cited
UNITED STATES PATENTS

| | | |
|---|---|---|
| 2,780,552 | 2/1957 | Willard, Jr. et al. ............... 426/465 |
| 3,016,303 | 1/1962 | Cooley ............................... 426/464 |
| 3,417,483 | 12/1968 | Willard ......................... 426/465 X |
| 3,418,142 | 12/1968 | Willard ............................. 426/464 |
| 3,535,128 | 10/1970 | Willard ............................. 426/456 |

*Primary Examiner*—Jack Sofer
*Attorney, Agent, or Firm*—James V. Harmon; Michael D. Ellwein

[57] ABSTRACT

Potato flour is prepared from waste potato mash containing 25 to 30 percent or more specks by placing the mash on a drum dryer to produce a dry sheet of potato on the drying drum, adjusting or maintaining the moisture content of the sheet between about 10 and 15 percent, grinding the resulting sheet to a particle size adapted to allow separation of peel specks from the uncontaminated potato pulp and separating the thus dried pulp from the peel specks by screening.

12 Claims, 2 Drawing Figures

METHOD OF EXTRACTING POTATO FLOUR FROM WASTE PEEL AND DEHYDRATOR WASTE

FIELD OF THE INVENTION

The invention relates to the production of potato flour from potato waste.

THE PRIOR ART

Potato flour is traditionally prepared by peeling whole potatoes and whole cull potatoes, cooking the resulting peeled potatoes, ricing or mashing and thereafter dehydrating them on a drum dryer. Waste specks such as eyes and peels are removed by the applicator rolls. The sheet which results is separated from the exterior of the drum by a doctor knife held in contact with the drum. It is then conveyed to a milling system. In this process the material going to the drum dryer is almost all useful potato pulp typically containing only about 0.1 to 1.5 percent specks or waste including the peel.

As used herein the term "waste mash" means a potato product in mash form containing edible potato pulp and specks, the latter being composed of a peel fraction and a non-peel fraction made up of eyes, bruises, sprouts, rot and foreign material.

In contrast with the prior art, it is the primary aim of the invention to prepare a useful potato flour product from waste mash which can include waste from a potato peeler as well as other potato waste such as potato dryer waste (scalper waste) which together may contain 25 percent or more peel. The problem of extracting and preparing a useful potato flour from this material is a good deal more difficult than it is in standard potato flour production in which the specks make up only about 1.5 percent The major difficulties are separation efficiency, and the prevention of the peel fraction from contaminating the finished product. It is also necessary to effectively reduce the number of specks in a primary separation operation to the point where remaining specks can be reliably removed in a separation operation. In addition, the peel should not be reduced to a fine powder which would interfere with its removal. It is also necessary to find a way in which to effectively separate a fairly high concentration of peel flakes from useful pulp. These are some of the problems encountered which do not occur in the traditional production of potato flour.

THE OBJECTS

The primary objects of the invention are: (a) to prepare a useful potato flour product from the waste potato mash which has a content of specks as high as 25 percent or more, (b) to effect a high degree of separation so that at least about 70 to 85 percent of the starting material is converted to a good quality potato flour; (c) to prevent the peel fraction from being reduced in size sufficiently small to become inseparable from the potato pulp; (d) to develop a method for separating a dried sheet of potato which contains pulp and peel into its components and more specifically, (e) to condition or maintain the dried sheet in a state which will facilitate separation of the peel from the pulp rather than allowing fragmentation of the peel pieces and (f) to develop a method of separating specks from pulp in two stages, the first a moist separation stage and the second a dry separation stage with the first of these steps reducing the waste content from a starting point of say 17 percent specks to about 6 percent or less specks and thereafter removing the remaining specks in the dry separation step.

SUMMARY OF THE INVENTION

Briefly, the present invention relates to a process for preparing edible potato flour from a waste potato mash containing both potato pulp and specks in which the speck content is much higher (as high as 25 percent or more specks) than in potato mash usually used for preparing potato flour. The process of separation is preferrably carried out in two stages with the preferred first stage consisting of removing primarily non-peel fraction specks from the surface of the heated drying drum by allowing the non-peel fraction to accumulate on applicator rolls positioned adjacent to and spaced circumferentially about the surface of the drying drum. In a preferred second stage of the operation, the resulting dried sheet of potato which still contains some peel waste (the peel fraction) is maintained or conditioned so as to fracture along cleavage lines between the peel and the useful pulp. It is then ground to fracture at the interfaces between the pulp and the peel. The term "grinding" as used here is meant reducing the product from large pieces to relatively small pieces and does not necessarily imply cutting, tearing or crushing. The resulting material is then separated, for example, by screening into peel and pulp fractions. All quantities herein are on a weight basis.

In one preferred form of the invention, the drying drum is heated to a temperature between about 310°–360°F., the applicator rolls are each spaced a predetermined distance on the order of a fraction of an inch away from the surface of the drying drum, the potato pulp accumulates as a layer on the drying drum and the specks are allowed to accumulate on each of the applicator rolls where they are periodically removed. The dried sheet of potato pulp on the drying drum is removed and the moisture content is adjusted to about 12±2 percent whereupon it is ground into pieces under conditions of mechanical impact adapted to fracture it on the cleavage lines at the interface between the peel waste and the pulp which are then separated from one another.

THE FIGURES

DESCRIPTION OF THE PREFERRED EMBODIMENT

The present invention will be described by way of example as an auxiliary operation in connection with the production of dehydrated potatoes from whole potatoes through the general process of cooking, preparing a potato mash, separating the peel from the pulp by pressing the pulp through a screen and drying the pulp, for example, by drum drying. There are two types of waste which result from this process. One is the mixture of peels and pulp that are removed as "peels" in the first stage when the pulp is pressed through a screen. The second is the waste containing eyes, specks, bruised pieces and the like that is removed from the dryer applicator rolls. The mash from these two sources when combined often contains about 25 percent or more waste.

Figure 1:
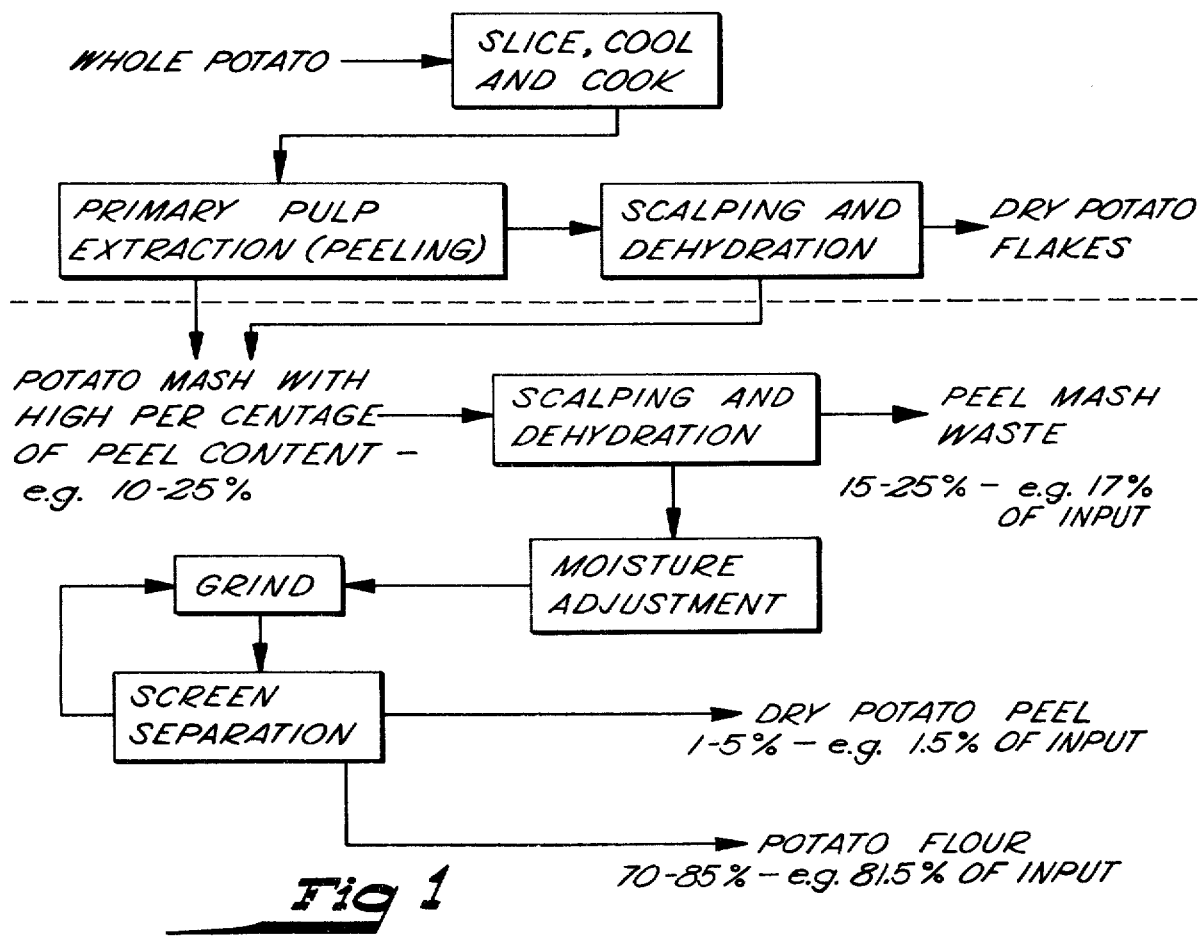
FIG. 1 is a flow chart illustrating one preferred form of practicing the invention.

In order to clearly describe the present process, an outline of the steps used in preparing dehydrated potato flakes has been shown above the dotted line in FIG. 1 for clarity but does not necessarily form a part of the present invention since the waste potato mash to be treated using the present process can be derived from any of a variety of sources.

Figure 2:
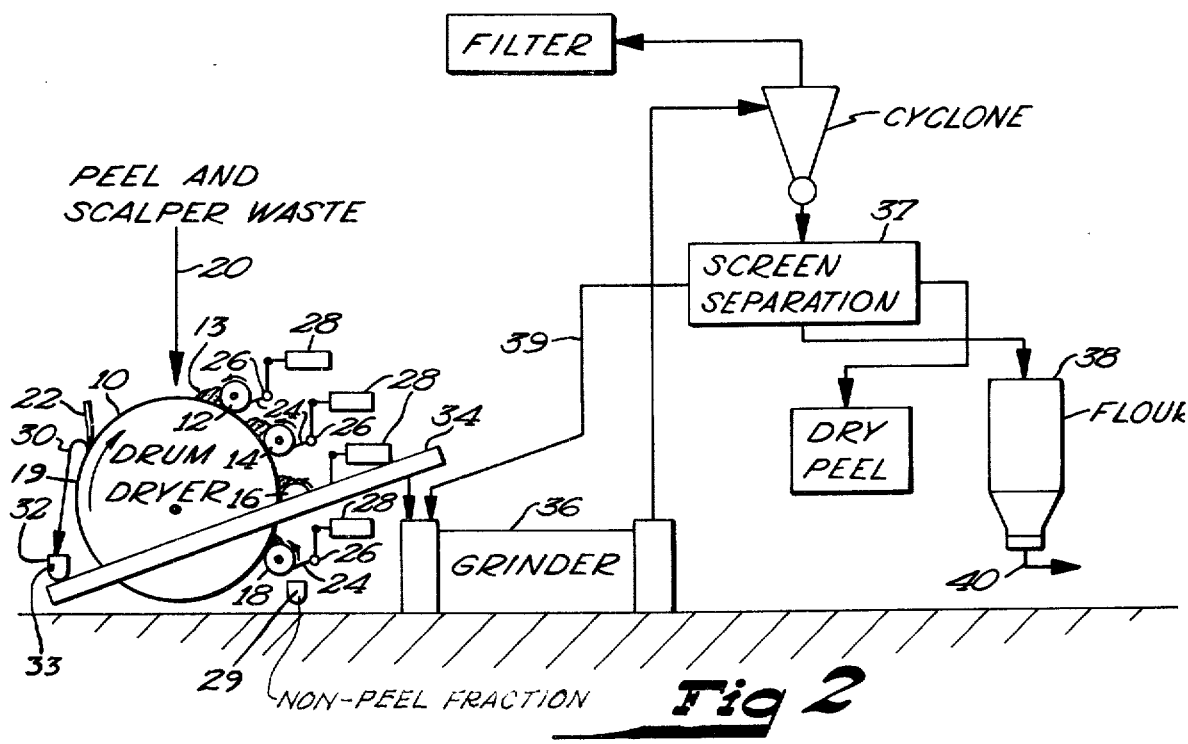
FIG. 2 is a schematic diagram illustrating the invention.

As shown in the Figures, the mash is applied first to a drying drum 10 thereby removing a substantial fraction e.g. 15 to 25 percent and usually on the order of about 15 to 20 percent of the specks through the action of a plurality of longitudinally extending parallel in circumferentially spaced applicator rolls 12, 14, 16 and 18 of FIG. 2. The specks removed in this stage are primarily made up of the non-peel fraction viz. eyes, sprouts, foreign matter, bruises, rot etc. Any of a variety of drum dryers 10 can be employed. A typical dryer production plant size is about 4 or 5 feet in diameter and 10 feet long. The rotational speed of the drum should not be so fast that the resulting dried sheet is wet or moist nor should it be so slow as to scorch the potato sheet 19 on the surface of the drum. In a typical application, it has been found that a drum on the order of 4 or 5 feet in diameter can run at a speed of about 5.5±2.5 r.p.m. with the drum temperature being variously between about 320° and 355°F. The incoming waste mash indicated at 20 is fed continuously onto the dryer drum 10 adjacent to the first applicator roll 12. The material is fed at a sufficient rate to maintain a supply of material 13 adjacent to the applicator roll 12 and conditions are maintained so as to run all the applicator rolls full at all times to avoid a starved condition which, if it occurred, could cause holes or other discontinuities in the sheet or cause a great increase in specks carried onto the drum.

It was discovered that certain operating conditions should be maintained to effect the desired separation of the speck portion from the waste mash. The drum temperature can vary from between about 310° to about 360°F. but it is preferred to be within the narrower range from about 340° to 345°F. The temperature of the drum should be as high as possible to maintain desired production rates but should not scorch the dried potato. The applicator roll gap proceeding from the roll 12 downwardly to the roll 18 can be changed within relatively wide limits, however, if too thin a layer exists there will not be enough on the applicator roll to transfer satisfactorily to the dryer drum. Moreover, transfer scrapers will have to be used more frequently to transfer material thereon from one applicator roll to the next. If the accumulated layer of material on the surface of each of the applicator rolls becomes too thick it could fall off which is, of course, undesirable. In a typical application, the applicator rolls 12-18 are spaced about a quarter of an inch from the drum. On one machine, for example, the rolls 12 to 18 were spaced respectively ¼ inch, 5/16 inches, 5/16 inches and ⅜ inches from the dryer drum 10. A doctor blade 22 in contact with drum 10 is maintained sharp at all times and it has been our experience that it should be sharpened more frequently than in a potato drying operation, typically, every 48 hours of operation.

Periodically, the accumulated material on each of the applicator rolls 12 through 18 is removed and transferred to the next lower roll 12-18 by means of mechanically actuated applicator roll scrapers 24 each pivoted at 26 and moved between engaging and disengaging positions by means of an actuator such as an air cylinder actuator 28. Material removed from the last roll 18 falls to a take-away conveyor 29.

The scrapers 24 each consist of a series of blades about an inch and a half in width spaced at intervals of about 8 inches apart along a line extending longitudinally of each applicator roll.

From the drum dryer the dried sheet which usually has a moisture content on the order of about 7 or 8 percent is sent to the grinder. However, before the dried sheet can be separated into useful potato flour and a peel fraction, it must be conditioned to fracture along the cleavage lines at the interface between the pulp and the peel fraction and it was discovered that this can be accomplished by maintaining or conditioning the sheet to a moisture content of about 12±2 percent moisture and preferably 12±1 percent moisture by weight. It was found that the conditioning in this way alters the physical characteristics of constituents of the sheet so that the fracturing will occur at the interface between the waste peel and the pulp where it is desired. However, if the moisture content is too low, the pieces of peel and other waste if present will themselves fracture and become mixed with the useful pulp.

The dried sheet 30 passes from the doctor blade downwardly to a sheet breaker 32 such as an auger which breaks the sheet into pieces that may be from an inch to 3 or 4 inches across. The thickness of the finished sheet 30 is the same as in conventional potato drying e.g. on the order of about 0.09±0.02 inches.

A water spray nozzle 33 is used in the prebreaker 32 to add moisture when necessary to the sheet to bring its total moisture content to about 12±2 percent. If too much moisture is added, the pulp will tend to plug the grinder. The proper moisture level is established and controlled during production by inspection of the final flour fraction and peel fraction. Excessive moisture results in high carryover of pulp into the peel fraction because pulp tends to cling to the peel.

Insufficient moisture results in high carryover of peel into the flour fraction because of excessive peel fracturing during grinding.

The finished potato flour should be checked, for example, by performing the Pekar slick test to evaluate peel contamination. Slicking should be accomplished every hour or so and moisture adjustments made if necessary.

From the sheet breaker 32, the pieces are carried by means of a conveyor 34 and introduced with a current of air to grinder 36 which is preferably an air swept fluid energy impact grinder such as the vertical shaft Pillsbury grinder or the horizontal grinder described in detail in brochure HB-2617 by the Pillsbury Company of Minneapolis, Minnesota (which is incorporated herein by reference). Grinders of this kind are manufactured by the Pillsbury Company of Minneapolis, Minnesota. In one typical application, the multi-bladed inpeller of the grinder has a diameter of about 11¾ inches and a blade tip speed of between about 188 to 220 feet per second at between about 3600 and 4200 r.p.m. to accomplish the desired degree of grinding. It was found that over about 5200 r.p.m. (a blade tip speed of 273 FPS) excessive grinding of the peel took place and at speeds of less than about 3600 r.p.m. the air flow is not sufficient to carry the particles through the grinder. The resulting material is then separated, for example, a screen separator 37 e.g. a vibratory separator manufactured by Smico Corporation of Oklahoma City, Oklahoma in which the screens consist of nylon filaments. In one typical operation, the particles ranging in size preferably from about 40 to about 120 mesh are preferably recycled through the grinder as indicated by line 39 or taken off as coarse flour. A preferred finished potato flour is less than about 80 mesh and preferably less than about 120 mesh. That which is over about 40 mesh is the peel fraction.

The finished dried peel is itself a highly unique product. It is a relatively pure form of peel. It is dry, stable and can be used as human or animal food. It is, moreover, relatively high in protein (protein is usually between about 10 and 12 percent and crude fiber content is about 6 percent).

The output of the screen separator passes to a cyclone separator 38 where the finished potato flour product is removed at 40.

The invention will be better understood by reference to the following examples:

EXAMPLE I

A potato flour is prepared from a potato waste mash containing specks in which the speck portion comprises 20 percent of the waste mash. The mash is a combination of peel waste and scalper waste from a potato drying operation. The waste mash is first applied to the top of a drying drum as described hereinabove and illustrated in FIG. 2. The drum is held at a temperature of about 310°F. and is rotated at a speed of about 3 r.p.m. The drum has a diameter of about 4 feet and is 10 feet long. A thin layer of about 0.09 inches is formed on the drying drum. The non-peel fraction of the specks accumulates on the applicator rolls of which there are four and is periodically removed by the scraper 24 to transfer the accumulation downwardly from one roll to the next and finally to a conveyor like conveyor 29. The sheet of potato is removed from the drum by a doctor blade and has a moisture content of about 8 percent. It is then sprayed with water to increase the moisture content to about 10 percent and is sent to an air swept fluid energy inpact grinder such as Pillsbury's grinder having a multi bladed inpeller with a diameter of 11¾ inches rotating with a blade tip speed about 188 feet per second. The resulting material is then screened to provide a maximum particle size of 120 mesh.

EXAMPLE II

Potato flour is prepared as in Example I with the following changes: the waste mash contains about 25 percent specks. The temperature of the drying drum is about 360°F. and the drum is rotated at a speed of about 8 r.p.m. The potato sheet contains about 7 percent moisture after being removed from the drum. Additional moisture is added by spraying until the moisture content of the sheet is about 14 percent. The sheet is then ground as described in Example I except that the grinder is run at a blade tip speed of about 273 feet per second. The resulting material is then separated into a peel fraction and a pulp product.

What is claimed is:

1. A method of preparing potato flour from potato waste mash comprising a mixture of potato pulp and specks, said specks being waste made up of a peel fraction and a non-peel fraction, with a drying drum and a plurality of longitudinally extending applicator rolls spaced circumferentially thereabout with each applicator roll located a selected distance on the order of a fraction of an inch from the surface of the drying drum, said distance also being less than that which allows potato on the rolls to fall off and greater than that wherein the potato will not transfer to the dryer drum, said process comprising: heating the drying drum to a temperature between about 310°–360°F., applying the potato waste mash containing specks to the drying drum, rotating the drying drum and the applicator rolls to cause the mash to form a layer on the drying drum and to cause primarily the non-peel fraction of the specks to accumulate on each of the applicator rolls, removing the non-peel fraction of the specks from each of the applicator rolls, removing dried potato containing specks primarily in the form of said potato peel from the drying drum in sheet form, periodically ascertaining the peel contamination of the finished potato flour to determine the amount of peel therein, conditioning the sheet by maintaining or adjusting the moisture content of the potato thus removed in sheet form between about 10 to 14 percent by weight, grinding the sheet by subjecting the sheet to mechanical impact, said moisture conditioning to between 10–14 percent and said mechanical impact grinding coacting to cause the dried potato sheet to fracture on the cleavage planes at the interface between the peel waste and the pulp, the fracturing at said interface being due to the physical characteristics of the sheet resulting from said conditioning and thereafter separating the pulp from the peel waste.

2. Process of claim 1 wherein material removed from each applicator roll is transferred to the next adjacent lower roll and the material removed from the bottom roll is discarded.

3. The process of claim 1 wherein the temperature of the drying drum is between about 340° and 345°F.

4. The process of claim 1 wherein the applicator rolls are held about a quarter of an inch from the drying drum.

5. The process of claim 1 wherein the moisture content of the potato sheet before grinding is maintained at between about 11 percent and 13 percent by weight.

6. The process of claim 1 wherein the potato sheet is first broken into pieces and thereafter conditioned to 10 to 14 percent moisture content and is then subjected to impact grinding by introducing the potato with a current of air through an air swept fluid energy impact grinder having a rotating multi-bladed impeller with a blade tip speed of between about 188 and 273 feet per second.

7. A substantially pure form of potato peel suited for use as human or animal food prepared by the process of claim 1.

8. The method of claim 1 wherein accumulated material on each of said applicator rolls is removed and transferred to the next lower roll and that from the last roll is thrown away.

9. The method of claim 1 wherein the pulp is separated from the peel waste by screening.

10. The method of claim 1 wherein the starting waste mash is between about 10 percent and 30 percent specks.

11. The process of claim 1 wherein the temperature of the drying drum is between about 340°–345°F., the speed of the drying drum is between about 3 and 8 r.p.m., the applicator rolls are held about a quarter of an inch from the drying drum and the potato after being conditioned to 10 to 14 percent moisture content is subjected to impact grinding by introducing the potato with a current of air through an air swept fluid energy impact grinder having a rotating multi-bladed impeller.

12. A substantially pure form of potato peel suited for use as human or animal food prepared by the process of claim 11.

* * * * *